United States Patent [19]

Miura

[11] Patent Number: 4,740,061
[45] Date of Patent: Apr. 26, 1988

[54] OPTICAL PATH SWITCHING MECHANISM

[75] Inventor: Shinsuke Miura, Hachiohji, Japan

[73] Assignee: Yamaichi Electric Mfg. Co., Ltd., Tokyo, Japan

[21] Appl. No.: 869,901

[22] Filed: Jun. 3, 1986

[30] Foreign Application Priority Data

Jun. 12, 1985 [JP] Japan .................................. 60-127617

[51] Int. Cl.$^4$ ................................................ G02F 1/29
[52] U.S. Cl. ..................................... 350/381; 350/401
[58] Field of Search ................................ 350/381–383, 350/385, 401

[56] References Cited

U.S. PATENT DOCUMENTS

| | | | |
|---|---|---|---|
| 2,182,142 | 12/1939 | Ball et al. | 350/401 |
| 2,745,316 | 5/1956 | Sziklai | 350/385 |
| 3,501,220 | 3/1970 | Bernal et al. | 350/381 |
| 4,335,939 | 6/1982 | Stovell et al. | 350/385 |

OTHER PUBLICATIONS

Denton, R. T. "The Laser and PCM" Bell Lab. Record, 6-1968, pp. 175–179.

Primary Examiner—William H. Punter
Attorney, Agent, or Firm—Wenderoth, Lind & Ponack

[57] ABSTRACT

An optical path switching mechanism includes a plurality of light deflecting elements adapted to transmit an optical beam in a direct-advance direction or a perpendicular direction depending on polarizing ingredients, and a plurality of polarizing ingredient converting elements adapted to convert one ingredient of a passing optical beam into the other polarizing ingredient. The light deflecting elements are arranged such that the direct-advance optical beam forms a communication optical path commonly used by the respective light deflecting elements and at the same time the perpendicular light deflecting optical beam forms branched optical paths each for the exclusive use of the individual light deflecting element. The light polarizing ingredient converting elements are arranged on the communication optical path of the light deflecting elements such that the light polarizing ingredient converting elements are alternately disposed with the respective light deflecting elements. The light polarizing ingredient converting elements are selectively actuatably.

2 Claims, 6 Drawing Sheets

OPTICAL PATH SWITCHING MECHANISM

BACKGROUND OF THE INVENTION

1. Field of the Invention

This invention relates to an optical path switching mechanism to be used for an optical communication and an optical information processing system, and more particularly to a non-mechanical type optical path switching mechanism utilizing an electro-optic effect.

2. Description of the Related Art

Vigorous investigation and study have been made in various communication and information processing systems utilizing optical fibers. The optical path switching mechanism is indispensable art for constituting these systems.

Most of the optical path switching mechanisms now in use are of $1 \times 2$ type (one input by two outputs), or $2 \times 2$ (two inputs by two outputs).

Furthermore, in order to highly develop and diversify the optical fiber communication and information processing systems, there is a large demand for the provision of an optical path switching mechanism of $m \times n$ type, $n \times n$ type, $1 \times n$ type or the like having a large number of input and output terminals.

Heretofore, the above-mentioned $m \times n$ type or $1 \times n$ type optical path switching mechanism uses the above-mentioned $1 \times 2$ type or $2 \times 2$ type optical path switching mechanism as a basic component unit, and a plural number of these component units are combined into a multi-stage form or a stratified form.

For example, an optical path switching mechanism of $1 \times 8$ type constituted by combining 7 pieces of $1 \times 2$ type unit optical path switching mechanism S is shown in FIG. 9 by way of a flow chart (detailed mechanism of each of the unit optical path switching mechanisms is omitted), wherein an optical signal inputted from an input terminal is optionally taken off from any of output terminals O1 through O8 having Nos. 1 through 8. In this switching mechanism, the optical signal is unavoidably required to pass 3 pieces of the optical path switching mechanism from the time when it is inputted until the time when it is outputted. Insertion loss thereof is more than three times of that when it is required to pass only 1 piece of the optical path switching mechanism. Generally, in a $1 \times 2^n$ type optical path switching mechanism adopting the afore-mentioned system, $$\sum_{k=0}^{n} 2^k$$

pieces of a $1 \times 2$ type unit optical path switching mechanism are required. In this case, the insertion loss is n times as much as that of a $1 \times 2$ type of unit optical path switching mechanism.

Furthermore, for example, an optical path switching mechanism of an $8 \times 8$ type employing a $2 \times 2$ type optical path switching mechanism S as its component unit and constituted by combining 32 pieces of such a $2 \times 2$ type unit optical path switching mechanism S is shown in FIG. 10 by way of a flow chart. In this mechanism, 8 kinds of optical signals inputted in the input terminals I1 through I8 of Nos. 1 through 8 can be optionally taken off from any of the output terminals O1 through O8 of Nos. 1 through 8. However, in this mechanism, the optical signals are required to pass 8 pieces of the unit optical path switching mechanism from the input to the output and the insertion loss thereof is 8 times as much as that when the signals pass only one unit of an optical path switching mechanism.

Generally, in the $n \times n$ type of optical path switching mechanism according to the above-mentioned system, $\frac{1}{2}n^2$ pieces of unit optical path switching mechanism are required. In this case, the insertion loss is n times as much as that of the unit optical path switching mechanism.

Furthermore, when an optical path switching mechanism is constituted by using the $1 \times 2$ type unit optical path switching mechanism shown in FIG. 9 as a basic component unit, the insertion loss thereof exceeds the allowable range extensively.

Accordingly, the characteristic requirements of a $1 \times n$ type, $n \times n$ type or $m \times n$ optical path switching mechanism are that, first, the insertion loss is small, second, it can be made small in bulk, third, switching speed is fast, and fourth, crosstalk characteristic is high.

Furthermore, the optical path switching mechanisms presently contemplated are largely classified into two types; one is a non-mechanical type optical path switching mechanism utilizing an electro-optic effect or magneto-optic effect, and the other is a mechanical type optical path switching mechanism wherein the optical path is switched by mechanically actuating an optical element such as a prism, etc. The former is further classified into two types, one is a photo-conductive wave path type switch chiefly used for a single mode fiber and the other is a bulk type optical path switch chiefly used for a multi-mode fiber. Although both facilitate a high switching speed, they present shortcomings or drawbacks in that if they are combined in multi-stages to constitute an optical path switch mechanism, the insertion loss becomes too large.

On the other hand, the latter mechanical type optical path switch mechanism renders a low insertion loss characteristic as well as a superior crosstalk characteristic, and therefore seems to be suitable for the optical path switch mechanism of $m \times n$ type, $1 \times n$ type, etc. However, since it is driven mechanically, it presents vital shortcomings in that the switching speed is extremely slow and a driving apparatus thereof becomes too bulky. Because of the foregoing reasons, such a switch mechanism is not actually employed in an optical path switch mechanism having a large number of input and output terminals.

The present invention was accomplished in order to overcome the above-mentioned shortcomings or drawbacks of the prior art.

SUMMARY OF THE INVENTION

It is therefore the object of the present invention to provide an optical path switching mechanism, wherein a non-mechanical type optical path switching mechanism utilizing an electro-optic effect is employed, so that the switching mechanism itself may be used as a basic circuitary net actually usable as $1 \times n$ type ($n \times 1$ type) or $1 \times n$ type ($n \times 1$ type) which is used as a basic component unit of $m \times n$ type, $n \times n$ type, etc. According to the present invention, the above-mentioned shortcomings such as high insertion loss, large bulk, etc. involved in the multi-stage type optical path switching mechanisms can be fundamentally solved. That is, the present invention aims at providing an optical path switching mechanism of a $1 \times n$ type, $n \times 1$ type or the like which can be used as the afore-mentioned basic circuitary net, wherein a high switching speed can be obtained while maintaining a low insertion loss and which has a high crosstalk characteristic. In addition, the switching mechanism according to the present invention is by far smaller in bulk and lighter in weight when compared with the conventional comparable switching mechanisms.

In order to achieve the above-described object, an optical path switching mechanism according to the present invention includes a plurality of light deflecting elements having a function of deflecting the emitting direction of an optical beam depending on light polarizing ingredients thereof, and a plurality of light polarizing ingredient converting elements having a function of converting the light polarizing ingredient of a passing optical beam when actuated, through combination of the light deflecting elements and the light polarizing ingredient converting elements, the optical beam being selectively emitted onto branched optical paths for the exclusive use of the respective light deflecting elements by means of selective actuation of the converting elements, or alternatively, the optical beam entering into the light deflecting elements from the branched optical paths being emitted into one end of a communication optical path or onto the branched optical path in the reverse direction of the other ingredient element.

BRIEF DESCRIPTION OF THE DRAWINGS

The above and other objects, features and advantages of the present invention will become more apparent to those skilled in the art from the following detailed description of the embodiments of the present invention, when taken in conjunction of the accompanying drawings, wherein FIGS. 1 through 8 illustrate one preferred embodiment of the present invention, in which:

FIG. 1 is a plan view of one embodiment of a $1 \times n$ optical path switching mechanism according to the present invention;

FIG. 2 is likewise a plan view of one embodiment of $n \times 1$ optical path switching mechanism according to the present invention;

FIG. 3 is likewise a plan view of another embodiment of a $n \times 1$ optical path switching mechanism according to the present invention;

FIG. 4 is likewise a plan view of another embodiment of a $1 \times n$ optical path switching mechanism according to the present invention;

FIG. 5 is likewise a plan view of another embodiment of a $n \times 1$ optical path switching mechanism according to the present invention;

FIG. 8 is a perspective view showing the vertically stratified and the horizontally stratified optical path switching mechanisms according to the present invention intersecting each other to form a matrix;

DETAILED DESCRIPTION OF THE PREFERRED EMBODIMENTS

One preferred embodiment of the present invention will be described with reference to the accompanying drawings.

Figure 1:
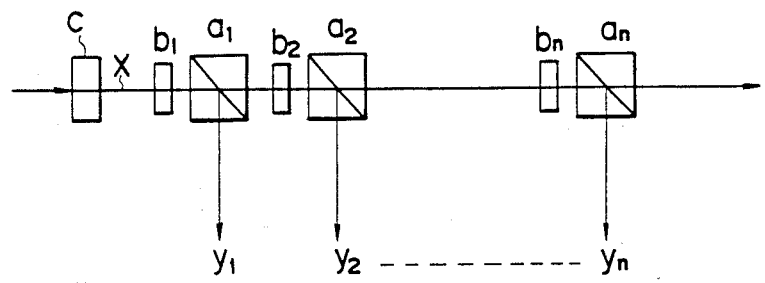

Referring first to FIG. 1, a basic circuit of an optical path switching mechanism of the present invention will be described.

The present invention includes at least a plurality of light deflecting elements a1 through an having a function of transmitting an optical beam propagating in a direction toward a direct-advance direction or a perpendicular direction depending on the light polarizing ingredients thereof and a plurality of light polarizing ingredient converting elements b1 through bn having a function of converting the light polarizing ingredient of the optical beam passing therethrough by means of electrical actuation.

One example of such light deflecting elements a1 through an as mentioned above is a light polarizing separating beam splitter. The light polarizing separating beam splitter comprises a pair of prisms having respective reflection surfaces attached together, the attached interfaces having a dielectric multilayer film interposed therebetween, the reflection surface formed at the attached interfaces being inclined at 45° with respect to an optical beam passing therethrough so that the optical beam is separated to propagate in a direct advance direction or a direction perpendicular thereto depending on the ingredients thereof.

On the other hand, one example of the light polarizing ingredient converting elements b1 through bn is a electro-optic effect element, particularly a secondary electro-optic effect element, and preferably a transparent seramic PLZT. The electro-optic effect element is provided on a pair of opposite surfaces thereof with electrodes which are parallel to the optical path and which are inclined at an angle of 45° relative to the direction in which a light beam is polarized. When a predetermined half-wave length voltage is applied, the photo-electric effect element transmits the optical beam passing therethrough after converting the light polarization ingredient thereof into the other light polarizing ingredient, and when the electric voltage is not applied, it transmits the optical beam without converting the light polarizing ingredient thereof.

The light deflecting elements are arranged such that the direct-advance optical beam, when continuously transmitted, travels along an optical path x common to the respective light deflecting elements.

At the same time, branched optical paths y1 through yn are formed for the exclusive use of the respective light converting elements a1 through an to which or from which the optical beam perpendicularly deflected by the respective light deflecting elements a1 due to the above-mentioned arrangement is transmitted. The respective branched optical paths y1 through yn are parallel to each other and form optical paths intersecting the communication optical path x at right angles.

Preferably, the respective light deflecting elements a1 through an are arranged such that the communication optical path x extends in a straight line. In other words, the respective light deflecting elements a1 through an are arranged on a straight line.

On the other hand, light polarizing ingredient converting elements b1 through bn are alternately arranged on the communication optical path as with the respective light deflecting elements a1 through an. When the respective light deflecting elements a1 through an are arranged on a straight line, the light polarizing ingredient converting elements b1 through bn are likewise arranged on a straight line. A predetermined optical circuit or a polarizer is provided in order to introduce an optical beam having a predetermined light polarizing ingredient from an entry port formed at one end of the communication optical path of the optical path switching mechanism.

Reference character c denotes a polarizer arranged at one end of the arrangement of the light deflecting elements a1 through an and the light polarizing ingredient converting elements b1 through bn and having a function of introducing an optical beam having a predetermined light polarizing ingredient into the communication optical path x. The polarizer c comprises a light polarization separating beam splitter, a light polarization plate adapted to permit only an optical beam having one light polarizing ingredient to pass therethrough, a half-wave length plate adapted to convert the light polarizing ingredient into the other, or the like and transmits an optical beam having one light polarizing ingredient along the communication optical path x.

Also, a one quarter-wave length plate may be used as the polarizer c. The one quarter-wave length plate has a function of transmitting an optical beam after converting a circular polarization beam having the respective light polarizing ingredients into an optical beam having the identical light polarizing ingredient and has such an advantage as that the whole light polarizing ingredients of the circular polarization optical beam can be utilized when compared to the case where the light polarization separating beam splitter or a light polarizing plate is used as the polarizer c.

As shown in FIG. 1, an optical beam (straightly polarized optical beam having only one of the light polarizing ingredients) entering from one end of the communication optical path x through an arrangement of the light deflecting elements a1 through an and the light polarizing ingredient converting elements b1 through bn passes through the light polarizing ingredient converting elements b1 through bn and the light deflecting elements a1 through an and is transmitted to the other end thereof when the light polarizing ingredient converting elements b1 through bn are not actuated. However, when any of the light polarizing ingredient converting elements b1 through bn is selectively actuated (for example, when the light polarizing ingredient converting element b2 is actuated), the optical beam passing through the element b2 has its light polarizing ingredient converted into the other light polarizing ingredient. Therefore, when the converted optical beam passes through the light deflecting element a2 disposed at a transmitting side of the element b2, its optical path changes and it is transmitted along branched optical path y2. Similarly, by selectively actuating the remaining light polarizing ingredient converting elements b1, b3 ... bn, the optical beam can be selectively transmitted onto its own branched optical paths y1, y3 ... yn via the light deflecting elements a1, a3 ... an positioned next to the actuated light polarizing ingredient converting element. That is, the optical path of 1×n is switched.

Figure 2:
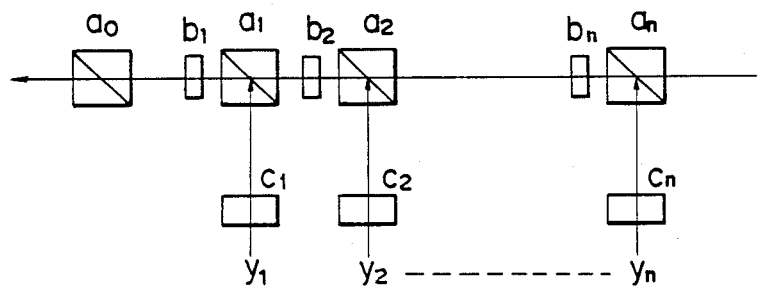

Next, FIG. 2 illustrates n×1 type optical path switching mechanism according to one embodiment of the present invention, wherein similar to the case of FIG. 1, light deflecting elements ao through an and optical ingredient converting elements b1 through bn are alternately arranged, the respective branched optical paths y1 through yn serve as an light entry port and one end of the communication optical path being serves as a light transmitting port, and an optical beam having one of the light polarizing ingredients enters from the respective branched optical paths y1 through yn through the light entry port, and the optical beam is transmitted onto the communication optical path x by selectively actuating the light polarizing ingredient converting elements b1 through bn. That is, for example, suppose the light polarizing ingredient converting element b2 is selectively actuated, when the optical beam is enters a2 from the branched optical path y2, the optical beam having the identical light polarizing ingredient as that of the optical beam transmitted onto the branched optical path shown in FIG. 1 is deflected at right angles by the light deflecting element a2 onto the communication optical path x, has its light polarizing ingredient further converted by the light polarizing ingredient converting element b2, and is transmitted to one end of the communication optical path x along the reverse optical path in FIG. 1.

In this case, even if an optical beam should enter from branched optical paths y1, y3 through yn other than the branched optical path y2, the light polarizing ingredient would not be converted since the light polarizing ingredient converting elements b1, b3 through bn are not actuated, and would not be transmitted to the transmitting port formed at the end of the communication optical path x.

By selectively actuating the light polarizing ingredient converting elements b1 through bn, the optical beam entering from the branched optical paths y1 through yn is transmitted to one end of the communication path x respectively through the actuated light polarizing ingredient converting elements b1 through bn positioned next to the light deflecting elements a1 through an of which the optical beam has entered.

In this way, the n×1 type optical path switching mechanism is constituted.

c1 through cn denote polarizers arranged at the light entry ports of the branched optical paths y1 through yn.

In order to constitute the optical path switching element mechanisms of FIGS. 1 and 2 or an optical path switching mechanism including both of them, when a predetermined optical beam having one of the light polarizing ingredients enters into the light entry port of the communication light path x and the light entry ports of the branched optical paths y1 through yn respectively, no polarizer is required. On the other hand, when an optical beam having the light polarizing ingredient other than the predetermined light polarizing ingredient enters into the respective light entry ports, the polarizers c are each provided at each of the entry ports, and the optical beam is introduced to the respective optical paths after the light polarizing ingredient is converted into the other light polarizing ingredient.

Figure 3:
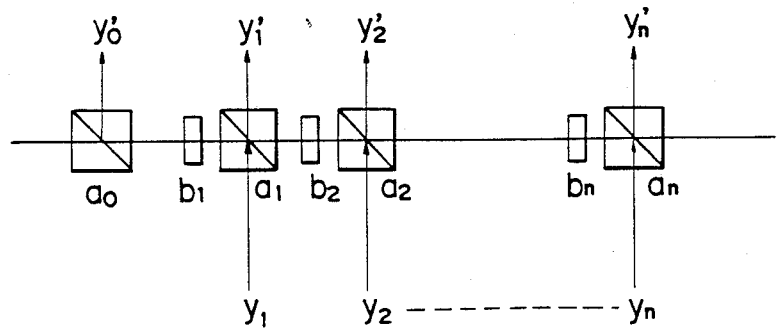

Next, FIG. 3 illustrates another embodiment of the present invention, wherein, with an arrangement of the respective elements of FIG. 2, the respective branched optical paths y1 through yn each serve as a light entry port and one end of the communication optical path x serves as the light emitting port, the optical paths (optical paths facing toward the extensions of branched optical paths y1 through yn) opposite to the branched optical paths y1 through yn serve as branched optical paths y'o through y'n for the exclusive use of the respective light deflecting elements which are each used as a light emitting port, and the optical beam entering from the branched optical paths y1 through yn are transmitted to one end of the communication optical path x or predetermined branched optical paths y'o through y'n corresponding to the light entry ports.

The light deflecting elements a1 through an have a function of separating the optical beam entering from one direction into a beam advancing in the direct-advance direction and another beam advancing in the perpendicular direction depending on the light polarizing ingredients thereof.

As described with reference to FIG. 2, by utilizing the character of the light deflecting elements a1 through an, the optical beam may enter therein after deflected at right angles by any of the respective branched optical paths y1 through yn and be transmitted onto the communication optical path x. Thereafter, the optical beam may be transmitted to one end of the communication optical path x by means of selective actuation of the light polarizing ingredient converting elements b1 through bn at the transmitting port side arranged on the communication optical path.

Furthermore, when the optical beam having the light polarizing ingredient for being deflected at right angles from any of the branched optical paths yo through yn while the light polarizing ingredient converting elements b1 through bn are maintained in a non-actuated state, although the optical beam is transmitted onto the communication optical path x, since the light polarizing ingredient converting element on the communication optical path arranged at the light transmitting side is maintained in the non-actuated state, the optical beam enters into the next light deflecting element without being having the light polarizing ingredient thereof converted, and is accordingly deflected at right angles there due to the character of the light deflecting element onto the branched optical path.

For example, the optical beam entering from the branched optical path y2 is deflected at right angles by the light deflecting element a2, passes through the light polarizing ingredient converting element as it is, is deflected at right angles by the light deflecting element a1 and is transmitted onto the branched optical path y'1.

That is, the optical beam can be transmitted to the branched optical path of the light deflecting element positioned next to the light deflecting element into which the optical beam has entered.

Alternatively, the optical beam may enter into the selected light deflecting element, for example, light deflecting element an to cause it to be deflected at right angles onto the communication optical path, transmitted onto the communication optical path x after having the light polarizing ingredient thereof converted by means of actuation of the light polarizing ingredient converting element bn through which the optical beam passes, have the light polarizing ingredient thereof again converted by means of actuation of an optional light polarizing ingredient, for example, b2 on the communication optical path x, and transmitted onto the branched optical path y'1 after deflected at right angles by the light deflecting element a1 positioned next to the light polarizing ingredient converting element b2.

Figure 4:
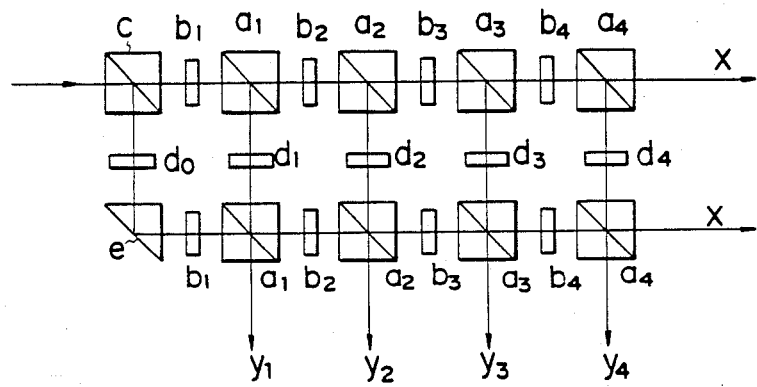

Another embodiment illustrated in FIG. 4 is constituted by an arrangement of the elements which were described with reference to FIG. 1 in two rows parallel with respect to each other, wherein the respective branched optical paths of both the element arrangements are held in a superposed relation with respect to each other, half-wave length plates do through dn each are disposed on each of the branched optical paths between both the element arrangements, the optical beam having one direction light polarizing ingredient is introduced onto the communication optical path x of one of the element arrangements, while the optical beam having the other direction light polarizing ingredient is introduced onto the communication optical path x of the other element arrangement, and the optical beams are transmitted in a superposed relation with respect to each other onto the branched optical paths y1 through yn from the light deflecting elements a1 through an positioned next to the actuated light polarizing ingredient converting elements b1 through bn by means of selective actuation of the light polarizing ingredient converting elements b1 through bn. One example of the polarizer c in the foregoing embodiment is a light polarization separating beam splitter. When a circular polarization beam is introduced into the light polarization separating beam splitter, the circular polarization beam is separated into a direct-advance optical beam and a perpendicular deflection optical beam depending on the light polarizing ingredient contained therein according to the character of the beam splitter. The direct advance optical beam is introduced into one of the element arrangements, the perpendicular deflection optical beam is converted to have the light polarizing ingredient thereof identical to the one introduced into the above-mentioned one of the element arrangements by means of the half-wave length plate do and is introduced onto the communication optical path x of the other element arrangement through a reflection element e.

In this way, due to the same operation principle as that described with respect to FIG. 1, the optical beam transmitted from the light deflecting element a3 of one of the element arrangements after being deflected at right angles by the light deflecting element a3 by means of actuation of the light polarizing ingredient converting element such as, for example, b3 has the light polarizing ingredient thereof converted by the half-wave length plate d3 and is transmitted onto the branched optical path y3 in the superposed relation with the optical beam emitted from the light deflecting element a3 of the other element arrangement.

Figure 5:
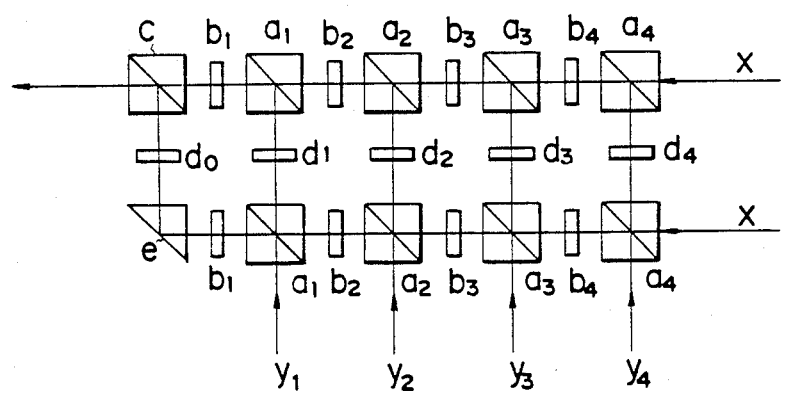

Another embodiment shown in FIG. 5 is constituted by the element arrangement of FIG. 4, wherein the branched optical paths y1 through yn each serve as a light entry port and the polarizer c as a light emitting port, the optical beam entering from the branched optical paths y1 through yn is transmitted onto the respective communication optical paths x via the light deflecting elements a1 through an, and the optical beam is transmitted in the superposed relation by having the light entry port of FIG. 4 serve as the light emitting port by means of actuation of the light polarizing ingredient converting elements b1 through bn positioned next to the entry light deflecting element.

The embodiments shown in FIGS. 4 and 5 enable the total light polarizing ingredients of the circular light polarizing optical beam to be utilized as in FIGS. 1 and 2, wherein the one quarter-wave length plate was used as the polarizer c.

Figure 7A:
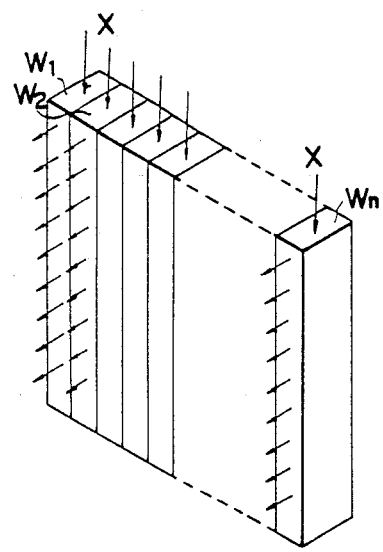
FIG. 7(A) is a perspective view showing a horizontally stratified state of vertical unit optical path switching mechanisms according to the present invention.
Figure 7B:
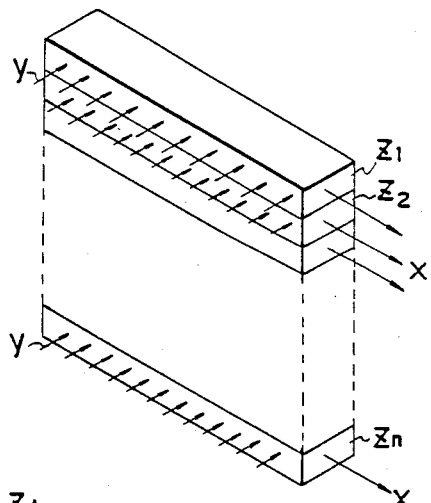
FIG. 7(B) is likewise a perspective view showing a vertically stratified state of horizontal unit optical path switching mechanisms according to the present invention.
Figure 8:
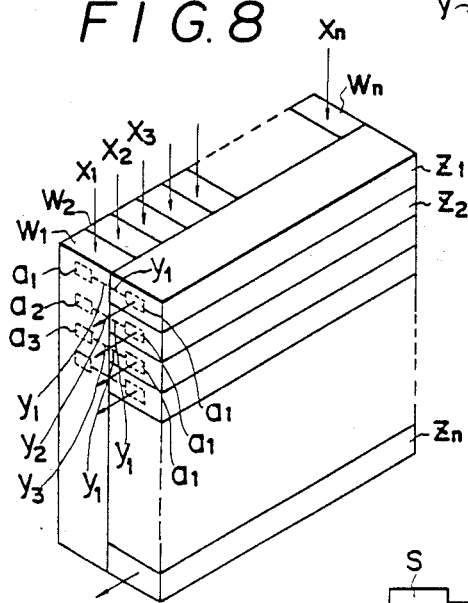

FIGS. 6 through 8 illustrate still another embodiment in which the principal mechanism described with reference to FIGS. 1, 2, 4 and 5 is used as a unit optical path switching mechanism, wherein a plurality of the unit optical path switching mechanisms communicate via the branched optical paths with one another, and the respective communication optical paths intersect the branched optical paths so that they communicate with one another to form an n×m or n×n type optical path switching mechanism.

Figure 6A:
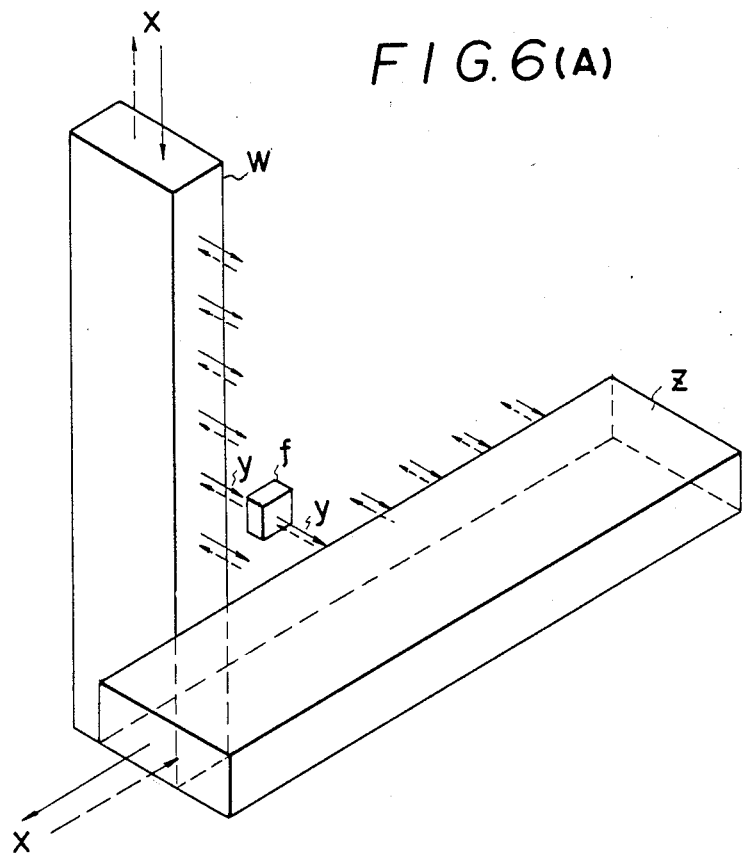
FIG. 6(A) is a perspective view illustrating the intersecting state of a vertical and a horizontal unit optical path switching mechanism according to the present invention.
Figure 6B:
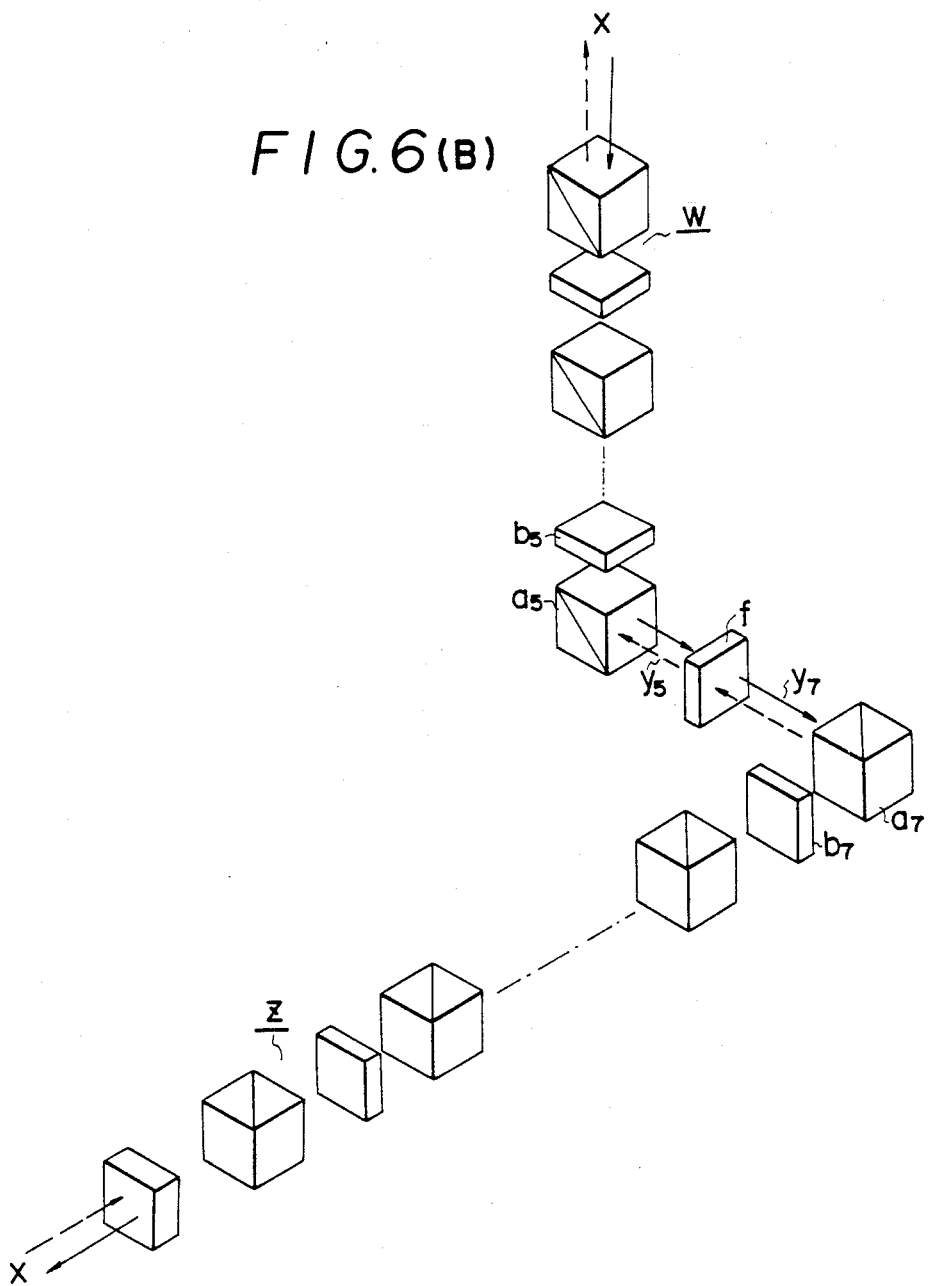
FIG. 6(B) is likewise a perspective view illustrating the intersecting state of FIG. 6(A) by showing a detailed elements arrangement thereof.

That is, as is shown in FIG. 6(A), a pair of unit optical path switching mechanisms are illustrated in order to explain the principle of the above-mentioned intersecting state and, as is shown in FIG. 6(B), a more detailed construction thereof is illustrated. An optional branched optical path (any of y1 through yn) of the vertical direction unit optical path switching mechanism W and an optional branched optical path (any of y1 through yn) of the horizontal direction unit optical path switching mechanism Z intersect so that they communicate with each other. For example, as shown in FIG. 6(B), the light deflecting element a5 of the vertical direction unit optical path switching mechanism W and the light deflecting element a7 of the horizontal direction unit optical path switching mechanism intersect with respect to each other so that the branched optical path y5 of the former and the branched optical path y7 of the latter communicate with each other through a light polarizing direction converting element f such as a one half-wave length plate or the like.

As described above, the vertical direction unit optical path switching mechanisms W1 through Wn are stacked in a horizontal direction so that the respective branched optical paths extend in the same plane as shown in FIG. 7(A) and the horizontal direction unit optical path switching mechanisms Z1 through Zn are stacked in a vertical direction so that the respective branched optical paths extend in the same plane as shown in FIG. 7(B), and both the stratified mechanisms intersect each other so that the respective branched optical paths are communicate with each other in a one-to-one fashion, as shown in FIG. 8, through the light polarizing direction converting element, thereby forming a matrix.

According to the above-mentioned embodiment, the branched optical paths y1 through yn of the vertical direction unit optical path switching mechanism W1 and the respective branched optical paths y1 of the horizontal direction unit optical path switching mechanisms Z1 through Zn intersect in a manner in which a relationship of y1 vs. y1, y2 vs. y1, y3 vs. y1 . . . exists and, the branched optical paths y2 through yn of the remaining vertical direction unit optical path switching mechanisms W2 through Wn and the branched optical paths y2 through yn of the remaining horizontal direction unit optical path switching mechanisms Z1 through Zn intersect in the same manner to form an optical path switching mechanism of an n×n matrix.

According to the embodiment of FIG. 8, a selective optical path switching of n×m, n×n from the communication optical paths x1 through xn extending in the vertical direction to the communication optical paths x1 through xn extending in the horizontal direction can be effected as shown by an arrow in the figure. Likewise, the optical path switching of m×n, n×n can be effected through reverse optical paths shown by the arrow.

As described above, by the combination of the light deflecting elements and the light polarizing ingredient converting elements, an optical path switching mechanism utilizing the photo-electric effect can be provided wherein one of the inputs or outputs of a 1×n and n×1 is single and the other of the inputs or outputs thereof is plural. With a matrix of such elements an optical path switching mechanism net can be provided wherein the input and output of an n×n and m×n type are plural.

Figure 9:
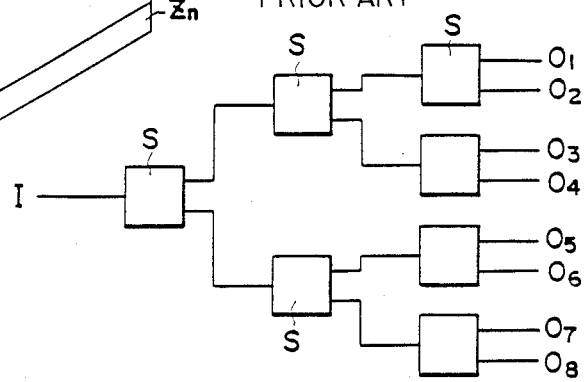
FIG. 9 is a plan view showing a conventional $1 \times n$ type optical path switching mechanism.

On the contrary, when an optical path switching mechanism net of 1×n is to be constituted by combining the conventional 1×2 unit optical path switching mechanisms as shown in FIG. 9, the respective units must be combined and arranged in a planar pattern. Accordingly, a large space is required, and thus the mechanism can not be made small. However, according to the present invention, since the mechanism can be constituted by merely linearly arranging the light deflecting elements and light polarizing ingredient converting elements, the above-mentioned optical path switching mechanism can be formed by using a very small number of elements. Thus, the switching mechanism according to the present invention can be made extensively small.

Figure 10:
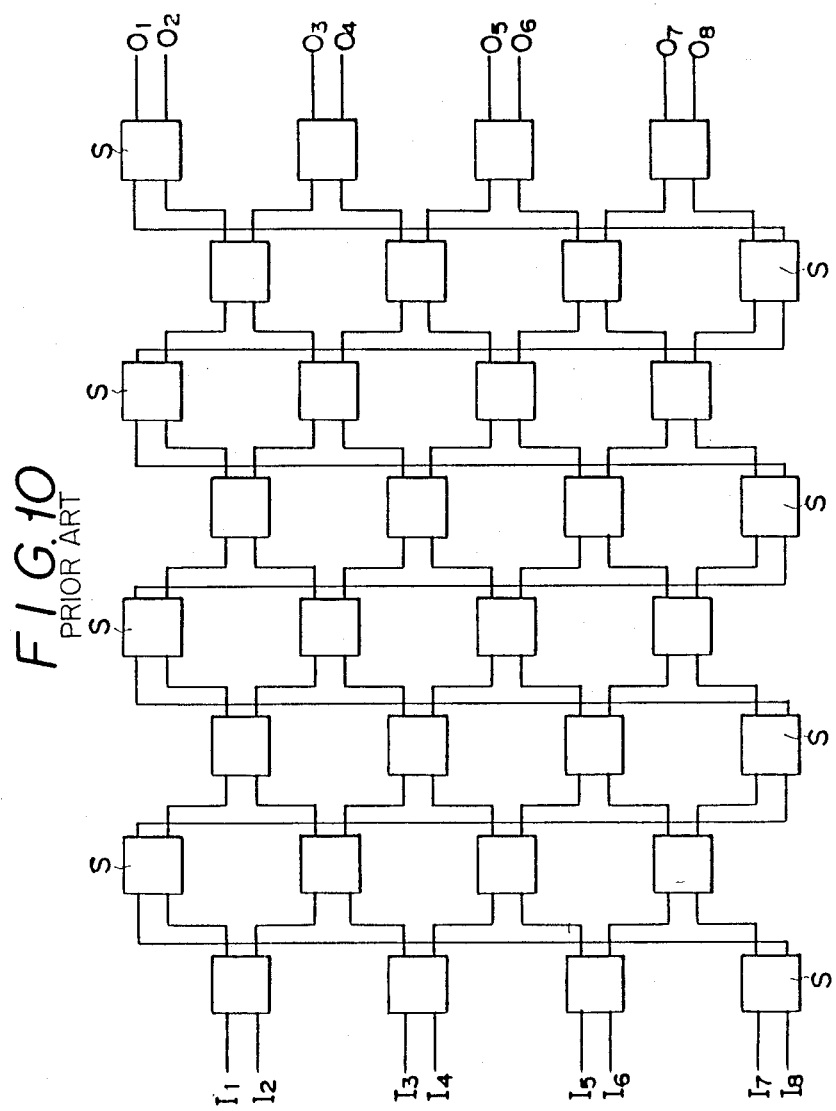
FIG. 10 is likewise a plan view showing a conventional $n \times n$ type optical path switching mechanism.

Furthermore, when compared with the case where an optical path switching mechanism net of n×n or m×n type is constituted by combining the conventional 2×2 type unit optical path switching mechanisms as shown in FIG. 10, the present invention enables the basic component units comprising a linear arrangement of the light deflecting elements and the light polarizing ingredient converting elements as described to simply form a matrix structure as described with reference to FIGS. 7 and 8, thereby to constitute the afore-mentioned three-dimensional optical path switching mechanism net. Accordingly, the present invention can provide an optical path switching mechanism net in which the need for increasing the number of elements and unit optical path switching mechanism groups according to the increase of the number of the conventional input and output terminals is eliminated, the complication of the combination thereof is eliminated, and wherein the number of the elements is remarkably small, the constitution is simple, and the mechanism itself is small and light.

The present invention naturally facilitates an extensive decrease of light insertion loss and crosstalk and realizes a highly reliable optical path switching mechanism net. Thus, if the present invention is employed in industries, it will surely produce a significant effect both technically and commercially.

While particular embodiments of the present invention have been shown in the drawings and described above, it will be apparent that many changes may be made in the form, arrangement and positioning of the various elements of the combination. In consideration thereof, it should be understood that preferred embodiments of the present invention disclosed herein are intended to be illustrative only and not intended to limit the scope of the present invention.

What is claimed is:

1. An optical path switching mechanism for switching the path of a light beam, said mechanism comprising:
   a plurality of vertically extending optical path switching mechanisms;
   a plurality of horizontally extending optical path switching mechanisms adjacent said plurality of vertically extending optical path switching mechanisms;

each of said vertically extending and said horizontally extending optical path switching mechanisms comprising a first set of optical elements including a plurality of light deflecting elements and polarization ingredient connecting elements alternately disposed along a common optical path, the common optical path extending vertically in said vertically extending optical path switching mechanisms, and the common optical path extending horizontally in said horizontally extending optical path switching mechanisms, each of said light deflecting elements for transmitting the light beam in a straight direction therethrough that extends along said common optical path when the light beam is polarized in a first polarization direction and for reflecting the light beam in a second direction along a respective branched optical path that extends perpendicular to said common optical path when the light beam is polarized in a second polarization direction and, the respective branched optical paths along which the light beam is reflectable by the light deflecting elements extending in a common plane, each of said plurality of polarization ingredient elements being selectively actuatable for changing the polarization of the light beam from one of said polarization directions to the other of said polarization directions when the light beam passes therethrough along said common optical path, each of the plurality of vertically extending optical path switching mechanisms disposed adjacent to and in a horizontal direction from another of the plurality of vertically extending optical path switch mechanisms, and said common plane in which the branched optical paths established by the respective light deflecting elements thereof extend extending in a vertical direction, each of said plurality of horizontally extending optical path switching mechanisms disposed adjacent to and in a vertical direction from another of the plurality of horizontally extending optical path switching mechanisms, and said common plane in which the branched optical paths established by the respective light deflecting elements thereof extend extending in a horizontal direction, each of the horizontally extending optical path switching mechanisms extending across each of the vertically extending optical path switching mechanisms with each of the branched optical paths established by the light deflecting members of the horizontally extending optical path switching mechanisms aligned with a respective one of the branched optical paths established by the light deflecting members of the vertically extending optical path switching mechanisms in a one-to-one relationship; and polarization directing converting elements being actuatable for changing the polarization of the light beam from one of said polarization directions to the other of said polarization directions being disposed between the branched optical paths established by the light deflecting members of the horizontally extending optical path switching mechanism and the respective branched optical paths established by the light deflecting members of the vertically extending optical path switching members aligned therewith.

2. An optical path switching mechanism as claimed in claim 1, wherein each of said vertically extending and said horizontally extending optical path switching mechanisms further comprises a second set of optical elements facing said first set of optical elements, each said second set of optical elements comprising a plurality of light deflecting elements and polarization ingredient connecting elements alternately disposed along a common optical path that extends parallel to the common optical path of said first set of optical elements, each of said light deflecting elements thereof for transmitting the light beam in a straight direction therethrough that extends along said common optical path thereof when the light beam is polarized in a first polarization direction and for reflecting the light beam in a second direction along a respective branched optical path thereof that extends perpendicular to said common optical path thereof when the light beam is polarized in a second polarization direction, the branched optical paths established by the light deflecting elements of the first set of optical elements being aligned with respective ones of the branched optical paths established by the light deflecting elements of the second set of optical elements, and a plurality of one-half wavelength plates each of which is disposed between a respective one of the branched optical paths established by the light deflecting elements of said first set of optical elements and the branched optical paths established by the light deflecting elements of said second set of optical elements aligned therewith.

* * * * *